(12) United States Patent
Schwartz et al.

(10) Patent No.: US 7,393,424 B2
(45) Date of Patent: Jul. 1, 2008

(54) GYPSUM COMPOSITION

(75) Inventors: Steven A. Schwartz, Downingtown, PA (US); Sallie J. Lee, Havertown, PA (US); Frank J. Liotta, Jr., Downingtown, PA (US); Robert M. Arrell, Quarryville, PA (US)

(73) Assignee: Lyondell Chemical Technology, L.P., Greenville, DE (US)

( * ) Notice: Subject to any disclaimer, the term of this patent is extended or adjusted under 35 U.S.C. 154(b) by 0 days.

(21) Appl. No.: 11/804,000

(22) Filed: May 16, 2007

(65) Prior Publication Data

US 2008/0087198 A1    Apr. 17, 2008

Related U.S. Application Data

(62) Division of application No. 11/581,930, filed on Oct. 17, 2006, now Pat. No. 7,261,772.

(51) Int. Cl.
 *B32B 13/00*    (2006.01)

(52) U.S. Cl. .............. 156/39; 156/45; 264/333; 52/443; 106/772; 106/778

(58) Field of Classification Search ............... 156/39, 156/45; 264/333; 52/443; 106/772, 778
See application file for complete search history.

(56) References Cited

U.S. PATENT DOCUMENTS

| | | | |
|---|---|---|---|
| 6,527,850 B2 | 3/2003 | Schwartz et al. | 106/772 |
| 6,670,415 B2 | 12/2003 | Jardine et al. | 524/445 |
| 6,869,988 B2 | 3/2005 | Schwartz et al. | 524/5 |
| 7,070,648 B1 | 7/2006 | Schwartz et al. | 106/772 |

*Primary Examiner*—Paul Marcantoni
(74) *Attorney, Agent, or Firm*—Shao-Hua Guo

(57) ABSTRACT

A gypsum composition comprising water, stucco, clay, an amine compound, a polyoxyalkylene, and a comb-branched copolymer is disclosed. The gypsum composition has improved fluidity. A method for preparing the gypsum composition is also disclosed. The method comprises mixing the components to form a slurry, casting the slurry into a product, and drying the product.

15 Claims, No Drawings

GYPSUM COMPOSITION

Division of application Ser. No. 11/581,930, filed Oct. 17, 2006, now U.S. Pat. No. 7,261,772.

FIELD OF THE INVENTION

The invention relates to a gypsum composition. More particularly, the invention relates to clay-containing gypsum slurry that has improved fluidity.

BACKGROUND OF THE INVENTION

Hemihydrate gypsum (stucco) is commonly produced from gypsum ore by drying, grinding and calcining it. The calcination step is employed to convert the dihydrate gypsum to the hemihydrate gypsum as shown in the forward reaction:

$$CaSO_4 \cdot 2H_2O + heat > CaSO_4 \cdot 1/2 H_2O + 3/2 H_2O.$$

The above reaction is reversible. When water is added to the hemihydrate gypsum the reverse reaction occurs resulting in dihydrate gypsum.

One common application of gypsum is the manufacture of wallboard. The amount of water necessary to produce the required fluidity to manufacture wallboards exceeds the amount of water necessary to convert the hemihydrate to the dihydrate gypsum. The excess water increases the time required for the slurry to set and the time required for the product to dry in a kiln.

One method of reducing the amount of water and improving the fluidity in a gypsum composition is to add a polymeric dispersant. For example, U.S. Pat. No. 6,527,850 discloses the use of a comb-branched copolymer in gypsum compositions to improve the fluidity. Similarly, U.S. Pat Nos. 6,869,988 and 7,070,648 respectively disclose the addition of a supported acrylic/polyether comb-branched copolymer and a sulfonate-containing comb-branched copolymer to gypsum compositions to improve the fluidity.

While gypsum rock or ore is predominantly gypsum, it may also contain clay. We have observed a negative interaction between the clay and the comb-branched copolymer dispersant. This results in the copolymeric dispersants becoming less effective. It would be commercially useful, if polymeric dispersants retain their effectiveness in the presence of clay.

SUMMARY OF THE INVENTION

The invention is a gypsum composition that contains water, stucco, clay, a polyoxyalkylene, an amine compound, and a comb-branched copolymer dispersant that comprises recurring units of a polyether macromonomer and an acrylic monomer. The invention also includes a method for making the gypsum composition which comprises mixing the components of the gypsum composition.

We surprisingly found that adding an amine compound, a polyoxyalkylene, and a comb-branched copolymer to a clay-containing gypsum composition increases the fluidity of the composition. We also surprisingly found that the product produced from the gypsum composition of this invention has a density and compressive strength that is similar to gypsum products produced with conventional foaming agents.

DETAILED DESCRIPTION OF THE INVENTION

The gypsum composition comprises water, stucco, clay, a polyoxyalkylene, an amine compound, and a comb-branched copolymer that comprises recurring units of a polyether macromonomer and an acrylic monomer.

Preferably the stucco is used in an amount greater than about 40 wt %, more preferably greater than about 45 wt %, and most preferably greater than about 50 wt % of the gypsum composition.

While clay is naturally found in some stucco, it may also be added to gypsum compositions. For instance, clays may be added to improve the flame retardancy of gypsum products. Suitable clay includes smectite, bentonite, illite, kaolinite, vermiculite, montmorillonite, hectorite, the like, and mixtures thereof. Preferably, clay is present in an amount within the range of about 0.01 wt % to about 10 wt %, more preferably within the range of 0.05 wt % to about 5 wt %, and most preferably within the range of about 0.1 wt % to about 2.0 wt % of the composition.

The amount of water required in the gypsum composition can be defined as "consistency", which is the volume of water (ml) for 100 g of stucco. The gypsum composition preferably has a consistency within the range of about 40 to about 150, more preferably within the range of about 50 to about 120, and most preferably within the range of about 60 to about 90.

Suitable polyether macromonomers for making the comb-branched copolymer have a polyether chain and a C=C double bond, which can be located anywhere in the polyether chain. Examples of suitable macromonomers include polyether monoacrylates, polyether monomethacrylates, polyether monoallyl ethers, polyether monomaleates, and polyether monofumarates. The polyether of the macromonomer is preferably an alkylene oxide polymer having a number average molecular weight preferably within the range of about 500 to about 10,000, more preferably within the range of about 750 to about 7,500, and most preferably within the range of about 1,000 to about 5,000. Suitable alkylene oxides include ethylene oxide, propylene oxide, butylene oxide, the like, and mixtures thereof. The polyether macromonomers preferably have hydroxyl functionality from 0 to 6. They can be either linear or branched polymers, homopolymers or copolymers, random or block copolymers, diblock or multiple-block copolymers. A preferred range for the propylene oxide is about 0 to about 80 wt % and for ethylene oxide is about 20 to about 100 wt % of the polyether macromonomer.

Examples of suitable polyether macromonomers include poly(propylene glycol) acrylates or methacrylates, poly(ethylene glycol) acrylates or methacrylates, poly(ethylene glycol)methyl ether acrylates or methacrylates, acrylates or methacrylates of an oxyethylene and oxypropylene block or random copolymer, poly(propylene glycol)allyl ether, poly (ethylene glycol)allyl ether, poly(propylene glycol)monomaleate, the like, and mixtures thereof. Preferred polyether macromonomer include poly(propylene glycol) acrylates and methacrylates, poly(ethylene glycol) acrylates and methacrylates, acrylates and methacrylates of oxyethylene and oxypropylene block and random copolymers, and mixtures thereof.

Suitable acrylic monomers for making the comb-branched copolymer are derived from acrylic acid and methacrylic acid. Preferred acrylic monomers include acrylic acid, methacrylic acid, their ammonium and alkali metal salts, their $C_1$ to $C_{10}$ alkyl and $C_6$ to $C_{12}$ aryl esters, and their amides and mixtures thereof. More preferred monomers include acrylic acid, methacrylic acid, ammonium acrylate, ammonium methacrylate, sodium acrylate, sodium methacrylate, potassium acrylate, and potassium methacrylate and mixtures thereof. Preferably the molar ratio of polyether macromonomer/acrylic monomer molar ratio is 1/10 or greater, more preferably 1/6 or greater.

Optionally, the comb-branched copolymer also comprises recurring units of sulfonate monomers. Suitable sulfonate monomers contain a sulfonate group and a polymerizable C=C double bond. Preferably the sulfonate monomer includes 2-acrylamido-2-methylpropanesulfonic acid, vinyl sulfonic acid, allyl ether sulfonic acid, 2-sulfoethyl methacrylate, styrene sulfonic acid, methallyl sulfonic acid, their sodium, potassium, ammonium salts, and mixtures thereof, more preferably 2-acrylamido-2-methylpropanesulfonic acid, styrene sulfonic acid, their sodium, potassium, and ammonium salts, and mixtures thereof.

Optionally, other monomers may be incorporated into the comb-branched copolymer, including vinyl aromatics, vinyl halides, vinyl ethers, vinyl esters, vinyl pyrrolidinones, conjugated dienes, unsaturated phosphonic acids, the like, and mixtures thereof. The amount of other monomers depends on the desired physical properties of the comb-branched copolymer. Preferably the amount of other monomers is less than 50 wt %, more preferably less than 40 wt %, and most preferably less than 30 wt % of the comb-branched copolymer.

The comb-branched copolymer has a weight average molecular weight preferably within the range of 10,000 to 150,000, more preferably within the range of 20,000 to 150,000, most preferably within the range of 40,000 to 100,000. Preferably the molecular weight distribution (Mw/Mn) of the comb-branched copolymer is less than 3, more preferably less than 2.

Preferably the comb-branched copolymer is at least partially neutralized if the acrylic or sulfonate monomers are acids. More preferably the copolymer is nearly completely neutralized. Suitable neutralizing agents include alkali metal oxides and hydroxides, alkaline earth metal oxides and hydroxides, ammonium, amines and mixtures thereof. Preferable neutralizing agents include sodium hydroxide, potassium hydroxide, calcium hydroxide, ammonium, triethanolamine, diethanolamine, triisopropanolamine, the like, and mixtures thereof.

The methods of preparing comb-branched copolymers are known in the art. For example, U.S. Pat. Nos. 6,527,850, 6,869,988, and 7,070,648, the teachings of which are incorporated herein by reference, describe how to prepare comb-branched copolymers. Comb-branched copolymers are also available commercially. An example is Ethacryl® dispersants from Lyondell Chemical Company.

The amount of the comb-branched copolymer present in the gypsum composition is preferably within the range of about 0.001 wt % to about 5 wt %, more preferably within the range of about 0.005 wt % to about 1 wt %, and most preferably within the range of about 0.025 wt % to about 0.5 wt %.

Suitable amine compounds include organic amines. Preferably the amine compounds include aliphatic amines, quaternary amines, alkoxylated amines, amine oxides, the like, and mixtures thereof. More preferably the amine compound is a quaternary amine. Many amine compounds are commercially available. Examples are Mirataine ASC (alkyl etherhydroxypropyl sultaine, $H(OCH_2)_4)ON^+(CH_3)_2CH_2CH(OH)CH_2SO_3^-$), Mirataine BB (lauramidopropyl betaine, $CH_3(CH_2)_{10}N^+(CH_3)_2CH_2CO_2^-$), and Mirataine CBS/LR (cocamidopropyl hydroxy sultaine, $CH_3(CH_2)_{10}CONH(CH_2)_3N^+(CH_3)_2CH(OH)CH_2SO_3^-$) from Rhodia Chemical Company and Ethomeen 18/60, PEG Stearamine, and PEG Cocamine from Akzo Nobel.

Preferably, the amine compound is present in an amount within the range of about 0.01 to about 4 wt %, more preferably within the range of about 0.1 wt % to about 1 wt % of the gypsum composition.

Suitable polyoxyalkylenes include polyoxyethylene, polyoxypropylene, polyoxybutylene, the like, and mixtures thereof. Polyoxyethylene is preferred. Preferably, the polyoxyalkylene has a hydroxyl functionality from 0 to 6. More preferably, the polyoxyalkylene has a hydroxyl functionality of about 2. Polyoxyalkylenes are commercially available, for example, Jeffox WL-5000 from Huntsman Chemical Company. Preferably, the polyoxyalkylene is present in an amount within the range of about 0.01 wt % to about 4 wt %, more preferably within the range of about 0.1 wt % to about 1 wt % of the total gypsum composition.

Additional components known to those skilled in the art may be included in the gypsum composition. For example, an accelerator may be included. Suitable accelerators include NaCl, $CaCl_2$, $Na_2CO_3$, $K_2SO_4$, finely ground gypsum and mixtures thereof.

Surprisingly we found the gypsum compositions containing the polymeric dispersant with the amine compound and the polyoxyalkylene showed an increase in fluidity from about 7% to about 70% compared to the gypsum compositions containing only the polymeric dispersant (Tables 1-4, discussed below). Another advantage is that the gypsum products made from the composition of the invention have low densities and high compressive strength comparable to gypsum compositions prepared with conventional foaming agents.

The method of making the gypsum compositions of this invention comprises mixing the stucco with an aqueous solution containing the comb-branched copolymer, the amine compound, and the polyoxyalkylene to form gypsum slurry. The slurry is cast into wallboards or other products which are then dried. Methods for making gypsum products such as wallboards are known by those skilled in the art. See for example U.S. Pat. No. 6,527,850, the teachings of which are herein incorporated by reference.

The following examples merely illustrate the invention. Those skilled in the art will recognize many variations that are within the spirit of the invention and scope of the claims.

EXAMPLE A

Preparation of Polyether Macromonomer

A polyether macromonomer (122.5 g, acrylate of oxyethylene/oxypropylene=70/30 by weight random copolymer, Mn of 3,000), methacrylic acid (18.0 g), mercaptopropionic acid (0.84 g) and ammonium persulfate (0.36 g) are charged into a one-liter reactor. The reactor is equipped with a stirrer, a temperature controller, a heating coil, a nitrogen purge device, a monomer addition pump, an initiator addition pump, and a sample outlet. The reactor contents are purged with $N_2$ for 20 min. A polyether macromonomer (245 g, same as above), methacrylic acid (35.9 g), mercaptopropionic acid (1.7 g) and deionized water (145 g, DI water) are mixed. The mixture is purged with $N_2$ for 20 min. and then charged into the monomer addition pump. Ammonium persulfate (0.72 g) that is dissolved in DI water (153 g) is purged with $N_2$ for 20 minutes and then charged into the initiator addition pump. The reactor contents are heated to 40° C. The monomer mixture and the initiator solution are continuously pumped into the reactor at the rates of 1.0 g/min. and 0.33 g/min., respectively. The product is continuously withdrawn from the reactor at a rate of 1.33 g/min. The comb-branched copolymer has a number average molecular weight Mn: 70,000 and a molecular weight distribution Mw/Mn: 1.25. The aqueous polymer solution is neutralized by adding a NaOH aqueous solution (114 g, 25%), resulting in 40 wt % aqueous solution.

EXAMPLE B

Fluidity Test

The fluidity test for the gypsum compositions is measured with a method derived from ASTM C472. Gypsum slurry compositions are prepared by swiftly adding 50 g of the stucco into an 8 ounce expandable polystyrene cup, containing either water alone or aqueous solutions of the dissolved dispersants and additives. The compositions are gently hand-agitated for 60 sec. using a ¾ inch metal spatula in order to provide uniform wetting of the gypsum, followed by more vigorous mixing for 30 sec. The gypsum slurries are poured out of the cup in one continuous motion from a height of 9 cm onto a clean, glass plate. The diameters of the resulting circular patties are then measured.

EXAMPLE 1 AND COMPARATIVE EXAMPLES C1(a) to C1(f)

The additives and the amounts used in the gypsum compositions, and the diameter of the gypsum shaped patties produced from these compositions are recorded in Table 1. The gypsum compositions are prepared and the diameters measured according to the method detailed in Example B. The consistency for every gypsum composition in these examples is 77 mL H$_2$O/100 g stucco. The compositions also contain sodium citrate, which acts as a set retarder.

Example 1 contains stucco, water, clay, sodium citrate, and all three additives: the amine compound, the polyoxyalkylene and the comb-branched copolymer. Comparative examples: C1(a) contains no additives, C1(b), contains the comb-branched copolymer only, C1(c) contains the quaternary amine only, C1(d) contains the polyoxyalkylene only, C1(e) contains the comb-branched polymer and the quaternary amine, C1(f) contains the comb-branched copolymer and the polyoxyalkylene.

The comb-branched copolymer used in the gypsum compositions is prepared according to the procedure set forth in Example A. The quaternary amine is Mirataine CBS/LR (co-camidopropyl hydroxysultaine, Rhodia), and the polyoxyalkylene is Jeffox WL-5000 (Huntsman).

Notably the composition of Example 1, which contains the copolymer dispersant, the quaternary amine and the polyoxyalkylene, has a diameter of 151 mm, while composition C1(b), which only contains the copolymer dispersant, had a patty diameter of 90 mm. The amine and polyoxyalkylene combined with the comb-branched copolymer are effective in improving the fluidity of the clay containing gypsum composition resulting in an increase in the patty diameter by 67%.

TABLE 1

| | Fluidity of Gypsum Compositions | | | | |
|---|---|---|---|---|---|
| Ex. No. | Comb-branched Copolymer (wt % on stucco) | Quaternary Amine (wt % on stucco) | Polyoxyalkylene (wt % on stucco) | Sodium Citrate (wt. % on stucco) | Patty Diameter (mm) |
| C1(a) | — | — | — | 0.5 | 109 |
| C1(b) | 0.1 | — | — | 0.5 | 90 |
| C1(c) | — | 1 | — | 0.5 | 99 |
| C1(d) | — | — | 0.8 | 0.5 | 107 |
| C1(e) | 0.1 | 1 | — | 0.5 | 107 |
| C1(f) | 0.1 | — | 0.4 | 0.5 | 96 |
| Ex. 1 | 0.1 | 1 | 0.4 | 0.5 | 151 |

EXAMPLE 2 AND COMPARATIVE EXAMPLES C2(a) to C2(g)

The additives and their amounts used in the gypsum compositions, and the diameter of the gypsum shaped patties produced from the compositions are recorded in Table 2. The gypsum compositions are prepared and the diameters measured according to the method set forth in Example B. The compositions also contain sodium citrate, which acts as a set retarder. The consistency for all gypsum compositions is 77 mL H$_2$O/100 g stucco.

Example 2 contains stucco, water, clay, sodium citrate, and all three additives: the amine compound, the polyoxyalkylene and the comb-branched copolymer. Comparative examples: C2(a) contains no additives, C2(b) contains the comb-branched copolymer, C2(c) contains the quaternary amine, C2(d) contains the polyoxyalkylene, C2(e) contains the quaternary amine and the polyoxyalkylene, C1(f) contains the comb-branched copolymer and the quaternary amine, and C1(g) contains the comb-branched copolymer and the polyoxyalkylene.

The comb-branched copolymer used in Example 3 is prepared according to the procedure set forth in Example A. The quaternary amine is Mirataine BB (lauramidopropyl betaine, from Rhodia), and the polyoxyalkylene is Jeffox WL-5000 (Huntsman).

Notably the gypsum composition of Example 2 has a patty diameter of 135 mm, while the comparative composition C2(b) has a patty diameter of 90 mm. The amine and polyoxyalkylene combined with the comb-branched copolymer are effective in improving the fluidity of the clay containing gypsum composition resulting in an increase in the patty diameter by 50%.

TABLE 2

Fluidity of Gypsum Compositions

| Ex. No. | Comb-branched Copolymer (wt % on stucco) | Quaternary Amine (wt % on stucco) | Polyoxyalkylene (wt % on stucco) | Sodium Citrate (wt. % on stucco) | Patty Diameter (mm) |
|---|---|---|---|---|---|
| C2(a) | — | — | — | 0.5 | 109 |
| C2(b) | 0.1 | — | — | 0.5 | 90 |
| C2(c) | — | 1 | — | 0.5 | 92 |
| C2(d) | — | — | 0.8 | 0.5 | 107 |
| C2(e) | — | 0.4 | 0.4 | 0.5 | 103 |
| C2(f) | 0.1 | 1 | — | 0.5 | 106 |
| C2(g) | 0.1 | — | 0.4 | 0.5 | 96 |
| Ex. 2 | 0.1 | 1 | 0.4 | 0.5 | 135 |

EXAMPLE 3 AND COMPARATIVE EXAMPLES C3(a) to C3(f)

The additives and their amounts are recorded in Table 3 along with the patty diameters. The gypsum compositions are prepared and the diameters measured according to the method detailed in Example B. The consistency for every gypsum composition in these examples is 77 mL $H_2O$/100 g stucco. The compositions also contain sodium citrate, which acts as a set retarder.

Example 3 contains the comb-branched copolymer prepared with the procedure of Example A, an aliphatic ethoxylated amine (Ethomeen 18/60 (PEG stearamine) from Akzo Nobel), and a polyoxyalkylene (Jeffox WL-5000 from Huntsman).

Comparative examples include: C3(a) contains no additives, C3(b) contains the comb-branched copolymer, C3(c) contains the aliphatic ethoxylated amine, C3(d) contains the polyoxyalkylene, C3(e) contains the comb-branched copolymer and the aliphatic ethoxylated amine, and C3(f) contains the comb-branched copolymer and the polyoxyalkylene. The increase in the patty diameter between Example 3 and Comparative Example C3(b) is 57%.

TABLE 3

Fluidity of Gypsum Compositions

| Ex. No. | Comb-branched Copolymer (wt % on stucco) | Ethoxylated Amine (wt % on stucco) | Polyoxyalkylene (wt % on stucco) | Sodium Citrate (wt. % on stucco) | Patty Diameter (mm) |
|---|---|---|---|---|---|
| C3(a) | — | — | — | 0.5 | 109 |
| C3(b) | 0.1 | — | — | 0.5 | 90 |
| C3(c) | — | 0.2 | — | 0.5 | 98 |
| C3(d) | — | — | 0.8 | 0.5 | 107 |
| C3(e) | 0.1 | 0.4 | — | 0.5 | 102 |
| C3(f) | 0.1 | — | 0.4 | 0.5 | 96 |
| Ex. 3 | 0.1 | 0.4 | 0.4 | 0.5 | 142 |

EXAMPLE 4 AND COMPARATIVE EXAMPLES C4(a) to C4(d)

The additives and their amounts are recorded in Table 4 along with the diameter of the gypsum compositions. The patty diameters are measured according to the method of Example B. Example 4 contains the comb-branched copolymer of Example A, a quaternary amine (Mirataine CBS/LR), and a polyoxyalkylene (Jeffox WL-5000) are used. Comparative examples include: C4(a) contains no additives, C4(b) contains the comb-branched copolymer, C4(c) contains the quaternary amine, and C4(d) contains the polyoxyalkylene.

The patty diameters are measured according to the method of Example B. The consistency for every gypsum composition in the examples is 75 mL $H_2O$/100 g stucco. The results are set forth in Table 4, which shows that adding a combination of the comb-branched copolymer, quaternary amine and polyoxyalkylene significantly increases the fluidity of the gypsum slurry. The increase in the patty diameter between Example 4 and Example C4(b) is 7%.

TABLE 4

Fluidity of Various Gypsum Compositions

| Ex. No. | Comb-branched Copolymer (wt % on stucco) | Quaternary Amine (wt % on stucco) | Polyoxyalkylene (wt % on stucco) | Patty Diameter (mm) |
|---|---|---|---|---|
| D1(a) | — | — | — | 162 |
| D1(b) | 0.04 | — | — | 149 |
| D1(c) | — | 0.4 | — | 158 |

TABLE 4-continued

Fluidity of Various Gypsum Compositions

| Ex. No. | Comb-branched Copolymer (wt % on stucco) | Quaternary Amine (wt % on stucco) | Polyoxyalkylene (wt % on stucco) | Patty Diameter (mm) |
|---|---|---|---|---|
| D1(d) | — | — | 0.16 | 164 |
| Ex. 4 | 0.04 | 0.4 | 0.16 | 170 |

EXAMPLE 5

Preparation of Foamed Gypsum Cubes

A 10 wt % aqueous solution (14.4 g) of the composition described in Example 1 is combined with water (107.46 g) and mixed for one minute in a Hamilton Beach Classic Drink Mixer until foamy. In a separate container, stucco (300 g) is added to a mixture of water (71.64 g) and the 10 wt % aqueous solution (9.6 g) of the composition described in Example 1. The foamed aqueous solution is immediately combined with the stucco-containing mixture. The entire mixture is gently hand-mixed with a one-inch wide metal spatula, and then mixed on the highest speed in the Hamilton Beach Commercial Mixer (20 sec.). The diameter of the gypsum patty is measured according to Example B. Initial set times are determined by when a knife does not slice through the patty.

The remainder of the material is transferred into three cubic molds (2 in.×2 in.×2 in.) (American Cube Mold, Inc.). The cubes are conditioned by a procedure patterned after ASTM C472, Section 12: "Compressive Strengths of Cubes". The cubes are stored in moist air (90-100% RH) for 16 hours and then dried in an oven (45° C., <50% RH) until a constant weight is reached. The cubes are transferred to a desiccator for at least 16 hours before measuring the compressive strength of the cube. Compressive strengths for the cubes are measured using a Twelve Ton Carver Press (No. 3851, Model C). The loading rate is between 15 and 40 psi. The set time, density and cube compressive strength are set forth in Table 5.

COMPARATIVE EXAMPLE 6

Preparation of Foamed Gysum Cubes Using a Foaming Agent

The procedure set forth in example 5 is followed except a conventional foaming agent is used in place of the comb-branched polymer, amine, and polyoxyalkylene solution. A 2 wt % aqueous solution of the foaming agent (9.75 g, Steol DES 32, Stepan Company) is combined with water (78.74 g) and mixed for 1 minute in a Hamilton Beach Classic Mixer. In a separate container, 300 g of stucco is added to a mixture of water (101.61 g) and 8.0 g of a 10 wt % aqueous solution of the comb-branched polymer prepared in Example A. The foamy mixture is immediately dispensed into the stucco-containing mixture, and mixed with a one-inch wide metal spatula. The remaining steps in this procedure are the same as the procedure set forth in Example 5. The set time, density and compressive strength are set forth in Table 5.

Surprisingly the set time, density and compressive strength of the gypsum cubes prepared with the quaternary amine and polyoxyalkylene (Example 5) compare favorably with the gypsum cubes prepared with a conventional foaming agent (Example 6). These results demonstrate that the conventional foaming agent could be eliminated or reduced in gypsum compositions.

TABLE 5

Foamed Gypsum Cubes and Properties

| Components and Properties | Example 5 (parts by weight) | Comparative Example 6 (parts by weight) |
| --- | --- | --- |
| Stucco | 100 | 100 |
| Water | 66.9 | 66.9 |
| Steol DES 32 | — | 0.65 |
| Comb-branched Copolymer | 0.05 | 0.4 |
| Mirataine CBS/LR | 0.53 | — |
| Jeffox WL-5000 | 0.21 | — |
| Set Time (mm:sec) | 3.26 | 3.14 |
| Density (g/cm$^3$) | 0.77 | 0.79 |
| Compressive Strength (psi) | 600 | 660 |

The invention claimed is:

1. A method of making the gypsum composition, said method comprising mixing water, stucco, clay, a polyoxyalkylene, an amine compound, and a comb-branched copolymer to form a slurry.

2. The method of claim 1, further comprising casting a product from the slurry, heating and drying the product.

3. The method of claim 2, wherein the product is a wallboard.

4. The method of claim 3, wherein the wallboard contains no other agent added for generating foam or for reducing the density of the wallboard.

5. The method of claim 1, wherein the clay is present in an amount within the range of about 0.01% to about 10% of the total weight of the gypsum composition.

6. The method of claim 1, wherein the clay is present in an amount within the range of about 0.05% to about 5% of the total weight of the gypsum composition.

7. The method of claim 1, wherein the polyoxyalkylene is present in an amount within the range of about 0.01% to about 4% of the total weight of the gypsum composition.

8. The method of claim 1, wherein the polyoxyalkylene is present in an amount within the range of about 0.1% to about 1% of the total weight of the gypsum composition.

9. The method of claim 1, wherein the amine compound is present in an amount within the range of about 0.01% to about 4% of the total weight of the gypsum composition.

10. The method of claim 1, wherein the amine compound is present in an amount within the range of about 0.1% to about 1% of the total weight of the gypsum composition.

11. The method of claim 1, wherein the amine compound is selected from the group consisting of aliphatic amines, quaternary amines, alkoxylated amines, amine oxides, and mixtures thereof.

12. The method of claim 1, wherein the comb-branched copolymer is present in an amount within the range of about 0.005% to about 1% of the total weight of the gypsum composition.

13. The method of claim 1, wherein the comb-branched copolymer is present in an amount within the range of about 0.025% to about 0.5% of the total weight of the gypsum composition.

14. The method of claim 1, wherein the polyether macromonomer is an acrylate or methacrylate of a propylene oxide and ethylene oxide copolymer.

15. The method of claim 1, wherein the comb-branched copolymer is at least partially neutralized.

* * * * *